United States Patent [19]

Mason et al.

[11] Patent Number: 5,380,545
[45] Date of Patent: * Jan. 10, 1995

[54] COATING MIX AND PROCESS FOR RETAINING MOISTURE IN COMMINUTED MEAT PRODUCTS

[75] Inventors: Charles R. Mason, Yonkers, N.Y.; Edward C. Coleman, New Fairfield, Conn.; Dalip K. Nayyar, Washingtonville; Sharon R. Birney, Yorktown, both of N.Y.

[73] Assignee: Kraft General Foods, Inc., Northfield, Ill.

[*] Notice: The portion of the term of this patent subsequent to Oct. 5, 2010 has been disclaimed.

[21] Appl. No.: 132,083

[22] Filed: Oct. 5, 1993

Related U.S. Application Data

[63] Continuation-in-part of Ser. No. 801,218, Dec. 2, 1991, Pat. No. 5,250,312.

[51] Int. Cl.$^6$ .............................................. A23L 1/317
[52] U.S. Cl. ................................... 426/646; 426/296; 426/575; 426/96
[58] Field of Search ................ 426/96, 575, 649, 648, 426/296, 289, 292, 302, 652, 646

[56] References Cited

U.S. PATENT DOCUMENTS

| | | | |
|---|---|---|---|
| 2,721,142 | 10/1955 | Shinn et al. | 426/652 |
| 3,395,024 | 7/1968 | Earle. | |
| 3,506,455 | 4/1970 | Savage et al. | 426/246 X |
| 3,552,978 | 1/1971 | Inklaar | 426/295 X |
| 3,674,505 | 7/1972 | Skinkawa. | |
| 3,792,173 | 2/1974 | Glabe | 426/92 |
| 3,794,742 | 2/1974 | Harris et al. | 426/302 |
| 4,196,219 | 4/1980 | Shaw et al. | 426/89 |
| 4,367,242 | 1/1983 | Jarvis et al. | 426/293 |
| 4,385,076 | 5/1983 | Crosby | 426/533 |
| 4,518,618 | 5/1985 | Hsia et al. | 426/262 |
| 4,560,574 | 12/1985 | Meyer | 426/649 |
| 4,786,515 | 11/1988 | Miller et al. | 426/281 |
| 4,792,457 | 12/1988 | Brna et al. | 426/574 |
| 4,897,275 | 1/1990 | Nagai et al. | 426/289 |
| 5,098,723 | 3/1992 | DuBois et al. | 426/96 |
| 5,098,724 | 3/1992 | DuBois et al. | 426/96 |
| 5,154,909 | 10/1992 | Ninane et al. | 423/499.5 |

FOREIGN PATENT DOCUMENTS

| | | | |
|---|---|---|---|
| 55-120774 | 9/1980 | Japan. | |
| 2-208219 | 8/1990 | Japan | 426/289 |
| 3-251146 | 11/1991 | Japan | 426/289 |

OTHER PUBLICATIONS

Duxbury, "Carrageenan/Phosphate Blends Developed For Low-Sodium, Low-Fat Poultry Products", Food Processing, Jun. 1991, pp. 41–42.

Primary Examiner—Carolyn Paden
Attorney, Agent, or Firm—Thomas R. Savoie; Thomas A. Marcoux

[57] ABSTRACT

A dry starch material is incorporated into a comminuted meat which is then shaped as desired. Thereafter, a dry mix containing a combination of salt having a particle size of 100% by weight minus 100 U.S. mesh and carrageenan is applied to the surface the shaped meat before cooking in a microwave or conventional oven. The cooked product retains a higher amount of moisture and has improved appearance, taste and texture as compared to cooked meat, poultry or seafood which is not treated before cooking.

11 Claims, No Drawings

COATING MIX AND PROCESS FOR RETAINING MOISTURE IN COMMINUTED MEAT PRODUCTS

This application is a continuation-in-part of U.S. Ser. No. 801,218 filed Dec. 2, 1991, now U.S. Pat. No. 5,250,312, issued Oct. 5, 1993.

BACKGROUND OF INFORMATION

This invention relates to novel coating mixes for use in treating meat, poultry or seafood prior to cooking and to processes employed for applying these coating mixes.

It is known to add certain materials to uncooked meat, poultry or seafood for the purpose of tenderizing and/or retaining moisture within the cooked foodstuff. For example, hams are injected with aqueous solutions of table salt and sodium pyrophosphate to achieve improved color and juice retention. U.S. Pat. No. 3,552,978 discloses the surface application of finely divided amino acids either alone or in combination with other substances such as table salt, spice and/or flavors in order to obtain a tenderizing effect on meat. U.S. Pat. No. 3,506,455 discloses impregnating uncooked meat, such as by needle injection, with organic material which is capable of binding meat fluids and reducing cooking loss. Materials such as starches, proteins, alginates, pectates, carrageenans, gums, modified cellulose and mixtures thereof. The use of gelling solutions on fresh meat, poultry and seafood in order to extend storage life has been disclosed in U.S. Pat. No. 3,395,024. The use of calcium salts of carrageenan as a coating dispersion for precooked meats, poultry and seafood in order to extend frozen storage life is disclosed in U.S. Pat. No. 4,196,219.

The use of coating mixes in advance of cooking meat, poultry and seafood are known. These coating mixes are generally intended to retain moisture, improve appearance, tenderize, provide a flavor impact or provide a crisp coating. These prior art coatings have found utility, particularly in the home environment, to enable the preparation of meat, poultry and seafood with increased appeal; however, these coatings generally do not perform well in microwave ovens and do not perform well with meats such as pork.

It is a particular object of this invention to provide cooked comminuted meats which produce improved yields (i.e., moisture retention) and tenderness across a wide variety of foodstuffs and across a wide variety of cooking techniques (e.g. electric or gas-fired ovens, electric or gas-fired grills, broilers and especially microwave ovens).

SUMMARY OF THE INVENTION

Meat, poultry and seafood are known to lose moisture during cooking in either a conventional or microwave oven. This loss is typically more dramatic in meat or chicken as compared to seafood and in microwave ovens as compared to conventional electric or gas ovens. The process of this invention relates to dry coating mixes or aqueous slurries which may be applied to the surface of meat, poultry or seafood before cooking same and which result in cooked products which retain a higher yield and have an improved appearance and texture. Higher yields are generally linked to higher moisture levels and translate to increased economic efficiency.

This invention is suitable for home, restaurant or manufacturing use where the cook treats the meat, poultry or seafood immediately before cooking and serving. This invention can be utilized where meat, poultry or seafood is treated in accordance with this invention prior to cooking and serving or where the cooked product is thereafter frozen, refrigerated or otherwise preserved for subsequent reheating and consumption. This invention can also be used where the meat, poultry or seafood is treated and then frozen, refrigerated or otherwise preserved for subsequent cooking and consumption.

According to this invention carrageenan and micromilled salt is applied to the surface of uncooked (i.e., raw) meat, poultry or seafood piece prior to cooking in a manner where the carrageenan is at least partially absorbed into the piece. In the case of meat and poultry which possess surface pores having a relatively small size or structure, it has been found suitable to initially apply a dry mixture containing, and preferably consisting essentially of, carrageenan and micromilled salt to the surface of each piece of meat or poultry. This application can be affected simply by sprinkling the dry mix over the surface. It is believed, however, that added benefit can be obtained by massaging or rubbing the mix over the surface of the meat or poultry piece. Seafood, including fish fillets and shellfish (e.g., shrimp), may also be treated in this manner. The dry mix will typically be applied to at least the top surface of the foodstuff and, especially for meat and poultry, is preferably applied to essentially the entire outer surface. If the dry coating mix consists of carrageenan and micromilled salt, a second dry coating containing seasoning ingredients may be applied to one or more surfaces of the foodstuff. Alternatively, it is possible to include seasoning ingredients in the carrageenan-micromilled salt mixture and to have only a single coating step. Seafood is especially suited for the single-step coating technique. It is also appropriate, especially in the case of seafood, due to the fact that seafood has a coarser pore structure than does meat or poultry to sprinkle this mixture onto only the top surface of the foodstuff.

A further embodiment of this invention relates to the incorporation of a dry, uncooked starch within the matrix of comminuted meat products, such as ground beef, ground turkey, meat loaves, etc., in combination with the use of a coating mix. The unique combination of starch, carrageenan and micromilled salt has been found to significantly improve moisture and texture when employed with comminuted meat products.

It is believed, although not wishing to be limited thereto, that the efficacy of this invention results from the fact that the salt in combination with carrageenan provides a rapid infusion system into the foodstuff matrix. Specifically, the salt extracts a portion of the protein at the surface of the foodstuff and opens surface pores on the foodstuff thereby allowing the carrageenan to be rapidly assimilated into the matrix. The carrageenan will then be strategically placed to hold and bind water during the cooking process. The increased water-holding capacity of the system yields cooked products of outstanding juiciness and tenderness. This invention may find particular utility for use with low-fat meats, such as hamburger with less than 10% fat, which are notoriously dry after cooking.

DESCRIPTION OF THE PREFERRED EMBODIMENT

The micromilled salt to be used in the dry mixes of this invention has a particle size of less than 212 microns in diameter (equivalent to 100% by weight passing thru a No. 70 U.S. mesh standard screen), preferably less than 150 microns in diameter (100% thru a No. 100 U.S. mesh screen), more preferably less than 106 microns in diameter (100% thru a No. 140 U.S. mesh screen), and most preferably has a particle size distribution of 100% between 53 and 106 microns in diameter (equivalent to minus 140, plus 270 U.S. mesh). This contrasts to conventional table salt wherein the average particle size is in excess of at least 175 microns and wherein a substantial amount of salt material will be in excess of 350 microns.

The carrageenan for use in this invention is preferably a kappa carrageenan such as a water-soluble extractive from red seaweeds (Rhodophyta) of the order Gigartinales. Genugel/ type MB-51 and CHP-2, products of Copenhagen Pectin (a subsidiary of Hercules Incorporated, Wilmington, Del.), have both proven to be highly functional for use in this invention.

According to one embodiment of this invention which typically is utilized for meat and poultry, but can also be used for seafood, a dry mix consisting of the micromilled salt and carrageenan, typically in a weight ratio of 0.75-10:1, preferably 1.0-5.0:1, and most preferably about 1.0-3.0:1, is applied to the surface of the uncooked pieces. The use level for the carrageenan will typically be about 0.01 to 0.07 grams per square inch of surfaces being coated. After application of the salt-carrageenan mix, the pieces are contacted and coated with a dry seasoning blend containing a conventional assortment of food ingredients, such as sugars, flavors, spices, colors and dried vegetables. One major advantage of this embodiment is that the food piece which has been pretreated with the salt-carrageenan mix exhibits a relatively dry surface which does not pick up large amounts of the dry seasoning blend. Typically, the seasoning blend is applied by shaking the pretreated food piece and seasoning mix together in a plastic bag. It has been estimated that the pick-up of the seasoning blend is at least four times higher for the untreated food pieces versus the salt-carrageenan treated pieces. This effect produces obvious cost advantages.

According to another embodiment of this invention, which is typically used for seafood, such as fish fillets, but can also be used for meat and poultry, a dry mix containing the micromilled salt, carrageenan and seasoning blend is sprinkled onto the top surface of the foodstuff. In these mixes, the ratio of micromilled salt to carrageenan will typically be at a level of 3-10:1, more typically 3.5-7:1. Carrageenan use levels comparable to those recited above will be suitable.

A further embodiment of this invention involves the use of starch, such as a modified food starch, incorporated within the matrix of a comminuted meat product. The level of incorporation is typically about 1 to 6%, preferably 1.5 to 5% by weight of the comminuted meat. After incorporation of the dry starch, the comminuted meat matrix is formed to the desired shape, typically patties or loaves.

This invention is further described but not limited by the following examples.

EXAMPLE 1

Four center-cut pork chops, totalling approximately one pound, are placed in a dish arranged in a single layer. A dry tenderizer mix consisting of 2.14 grams of salt and 1.41 grams of carrageenan is sprinkled evenly over both sides of the pork chops. The surfaces of the chops are massaged to insure even distribution of the mix. The salt contained in the mix was screened to have a particle size of through a 140 U.S. mesh screen and retained on a 270 U.S. mesh screen. The carrageenan was Genugel/ carrageenan type MB-51 from Copenhagen Pectin and had a particle size of less than 3% retained on a 60 mesh U.S. Standard Sieve. Twenty grams of a powdered seasoning mix containing sugar, spices, flavors and coloring agent is placed in a plastic bag and the treated pork chops, one at a time, was placed in the bag and shaken with the seasoning mix. Excess seasoning mix is discarded. The thus coated pork chops are placed in a baking dish and placed uncovered in a microwave oven and cooked for 12 minutes at medium power. Alternatively, the coated pork chops can be cooked for 22 minutes at 400° F. in a conventional oven. The cooked pork chops produced in accordance with this Example were more pleasing in appearance (i.e., more plump), texture (i.e., more moist, juicy and tender) and taste than uncoated pork chops cooked in the same manner.

EXAMPLE 2

Four, quarter-pound hamburger patties were formed from one pound of ground beef. The tenderizer mix of Example 1 (3.54 g) was evenly sprinkled over both sides of the patties. The patties were then coated with the seasoning mix (20 grams) of Example 1 in the manner described therein. The thus coated hamburgers are placed on a baking dish and placed uncovered in a microwave oven for 6 minutes at high power. Alternatively, the coated hamburgers are cooked in a conventional oven for 15 minutes at 400° F. The cooked hamburgers produced in accordance with this Example were more appealing in appearance (i.e., more plump), texture (i.e., more moist, juicy and tender) and taste than uncoated hamburgers cooked in the same manner.

EXAMPLE 3

Fresh fish fillets are washed and patted dry. Fillets weighing about one pound are placed flat in a glass baking dish arranged with the thicker portion towards the outside edge. A lemon, parsley, butter-flavored coating mix (17.5 g) was sprinkled evenly over the top surface of the fillets.

| Coating Mix | Weight % |
| --- | --- |
| Salt (as in Example 1) | 5.0 |
| Carrageenan (as in Example 1) | 1.5 |
| Sugar/Spices/Flavor/Color | 25.9 |
| Butter Powder | 51.9 |
| Bulking Agent | 15.7 |

The dish containing the coated fillets is covered with Saran/ plastic wrap and cooked in a microwave oven at high power for 5-6 minutes. The cooked fish should stand for two minutes before serving. Alternatively, the coated fish can be cooked in the same manner (but uncovered) in a conventional oven at 400° F. for 10-12 minutes. The cooked fish prepared in accordance with this invention was more appealing in appearance, texture and taste and had a higher cooked yield (90.7 vs. 83.4%) than uncoated fish cooked in the same manner.

EXAMPLE 4

Fresh fish fillets were prepared, coated and cooked as in Example 3 using an Italian-flavored coating mix (17.5 g).

| Coating Mix | Weight % |
| --- | --- |
| Salt (as in Example 1) | 14.1 |
| Carrageenan (as in Example 1) | 1.5 |
| Sugar/Spices/Flavors/Colors | 43.4 |
| Dried Vegetables | 13.9 |
| Bulking Agent | 12.5 |
| Grated Cheese | 14.6 |

The benefits derived from the use of the coating mix of this Example were as described in Example 3.

EXAMPLE 5

Using four center-cup pork chops for each variant as in Example 1 and treating and microwave cooking the chops using the methodology set forth in Example 1, a comparison was made between the absence of any treatment versus using only micromilled salt (2.14 g), only carrageenan (1.41 g) and a combination of micromilled salt (2.14 g) and carrageenan (1.41 g). Parameters measured were yield (weight after cooking/weight before cooking) and moisture of cooked product. The results are set forth in Table 1.

TABLE 1

| Treatment | Yield (%) | Moisture (%) |
| --- | --- | --- |
| None | 67 | 58.2 |
| Micromilled Salt | 76.6 | 61.5 |
| Carrageenan | 70.0 | 60.2 |
| Micromilled Salt/ Carrageenan | 82.1 | 67.4 |

As can be seen from the above Table 1, the combination of this invention produced the greatest yield and moisture level, with the levels of increase being more than cumulative.

EXAMPLE 6

Four quarter-pound hamburgers were treated and microwave cooked in accordance with Example 2 using the coating variants set forth in Example 5 and an additional table salt (2.14 g) variant. The results are set forth in Table 2.

TABLE 2

| Treatment | Yield (%) | Moisture (%) |
| --- | --- | --- |
| None | 75.6 | 59.5 |
| Micromilled Salt | 82.0 | 64.7 |
| Carrageenan | 79.2 | 61.4 |
| Table Salt | 76.4 | 61.1 |
| Micromilled Salt/ Carrageenan | 88.0 | 66.1 |

Again, the yield and moisture improvements were greatest for this invention and were unexpectedly large.

A comparable experiment for hamburgers cooked in a conventional oven comparing only no treatment with the micromilled salt/carrageenan combination showed improved yields of 69% versus 82% and moistures of 55.8% versus 61.9% and a distinct taste preference for the treated hamburgers.

EXAMPLE 7

Chicken cutlets totalling approximately 400 g were treated and cooked in the same manner as set forth as the pork chops in Example 5, except that microwave cooking was for six minutes at high power. The results are set forth in Table 3.

TABLE 3

| Treatment | Yield (%) |
| --- | --- |
| None | 84.9 |
| Micromilled Salt | 92.1 |
| Carrageenan | 90.8 |
| Table Salt | 89.7 |
| Micromilled Salt/ Carrageenan | 93.4 |

Improvements in yield were greatest for the coating mix of this invention.

Separate microwave cooking experiments with flounder fillets comparing only with and without the coating mix of this invention showed improved yields of 85% versus 78%.

EXAMPLE 8

An approximately one-pound portion of spare ribs was coated with the micromilled salt-carrageenan blend as in Example 1 and then cooked in a 650 watt microwave oven at 50% power to an end point temperature of 160° F. using a temperature probe (approximately 15 minutes). The % yield on this product was 84%. An approximately one-pound portion of spare ribs cooked in the same manner without any coating had a cook yield of 79%. When a seasoning mix (as in Example 1) was added to the coated and uncoated spare ribs before cooking, the respective cook yields were 86% and 75%.

EXAMPLE 9

Raw hamburgers were coated with the tenderizer mix and seasoning mix, as in Example 2, and then frozen and held frozen for one week. Uncoated hamburgers were similarly frozen and held. Hamburgers taken directly from the freezer and cooked in the same manner in a microwave oven exhibited a cooked yield of 76.5% for the coated hamburgers versus 65.1% for the uncoated hamburgers. Hamburgers which were taken from the freezer and held for one hour at room temperature before microwave cooking exhibited a cooked yield of 75.5% for the coated hamburgers and 69.3% for the uncoated hamburgers.

EXAMPLE 10

An experiment was conducted using quarter-pound hamburger patties formed from ground beef with all samples cooked in a Pyrex ® dish in a 650 watt microwave oven at high power for six minutes. A cooked yield was calculated for each of the samples (4 patties each). Sample A patties were untreated control. Sample B patties were coated with 3.55 grams of the tenderizer mix of Example 1, by evenly sprinkling the mix over both sides of the patties, and coated with 20 grams of seasoning mix also as in Example 1. Sample C and D patties had respectively 1.5% and 3% by weight of Firmtex ™ starch (a modified starch refined from waxy corn which is marketed by National Starch and Chemical Corporation, Bridgewater, N.J.) incorporated into the hamburger prior to formation of the patties. Sample E included 1.5% Firmtex ™ starch in the meat matrix and 3.55 grams of tenderizer mix and 20 grams of seasoning on the patty surfaces as in Example 1. Sample F included 3% Firmtex TM starch in the matrix and 3.55 grams tenderizer and 20 grams seasoning on the surfaces.

| Sample | Cooked Moisture (%) | Cooked Yield (%) |
|--------|---------------------|------------------|
| A      | 61.8                | 81.7             |
| B      | 61.5                | 85.7             |
| C      | 66.1                | 86.6             |
| D      | 66.5                | 89.9             |
| E      | 66.7                | 89.8             |
| F      | 66.2                | 94.5             |

EXAMPLE 11

Samples A, B, D and F were prepared as in Example 10 using different and somewhat higher fat hamburger. The patties were cooked in a microwave oven at high power for six minutes and then analyzed for yield.

| Sample | Cooked Yield (%) |
|--------|------------------|
| A      | 72.8             |
| B      | 81.8             |
| D      | 86.2             |
| F      | 87.3             |

EXAMPLE 12

Cooked patties from Example 11 were frozen and held frozen for two weeks. Thereafter, the patties were taken from the freezer, held at room temperature for one hour and then heated in a microwave oven at high power until an internal temperature of 120° F. (48.9° C.) is obtained (about 6 to 10 minutes). The patties were then analyzed for yield.

| Sample | Yield (%) (from raw) | Yield (%) (from frozen) |
|--------|----------------------|--------------------------|
| A      | 54.8                 | 80.5                     |
| B      | 68.2                 | 88.4                     |
| D      | 74.6                 | 88.7                     |
| F      | 78.5                 | 91.5                     |

Having thus described the invention what is claimed is:

1. A method for preparing and cooking comminute meat products comprising the steps of:
   (a) incorporating within the comminuted meat matrix a dry starch at a level of from 1 to 6% by weight of the meat and thereafter forming the meat matrix into shaped pieces;
   (b) evenly applying a dry mix containing salt having a particle size of 100% by weight through a No. 70 U.S. Standard Sieve and particles of carrageenan, the ratio of salt to carrageenan being 0.75–10:1, to the surface of the shaped pieces; and,
   (c) cooking the coated and shaped pieces.

2. The method of claim 1 wherein the dry mix consists essentially of the salt and carrageenan.

3. The method of claim 2 wherein the carrageenan is kappa carrageenan.

4. The method of claim 1 wherein the dry mix contains seasonings.

5. The method of claim 4 wherein the dry mix additionally contains ingredients selected from the group consisting of sugar, spices, flavors, colors, dried vegetables, bulking agents and thickening agents and combinations thereof.

6. The method of claim 1 wherein the meat, poultry or seafood is frozen after application of the slurry and before cooking.

7. The method of claim 1 wherein the meat, poultry or seafood is frozen after cooking.

8. A method for preparing and cooking comminuted meat products comprising the steps of:
   (a) incorporating within the comminuted meat matrix a dry starch at a level of from 1 to 6% by weight of the meat and thereafter forming the meat matrix into shaped pieces;
   (b) evenly applying a dry mix containing salt having a particle size of 100% by weight through a No. 70 U.S. Standard Sieve and particles of carrageenan, the weight ratio of salt to carrageenan being 0.75–10:1, to the surface of the shaped pieces;
   (c) applying a second dry coating mix to the surface of the shaped pieces from step (b), said second coating containing seasonings; and
   (d) cooking the twice-coated pieces.

9. The method of claim 8 wherein the dry mix of step (b) consists essentially of the salt and carrageenan.

10. The method of claim 9 wherein the ratio of salt to carrageenan is about 1.0–3.0:1.

11. The method of claim 9 wherein the carrageenan is kappa carrageenan.

* * * * *